(Model.) 2 Sheets—Sheet 1.

C. E. BALL
Dynamo or Magneto-Electric Machine.

No. 238,631. Patented March 8, 1881.

WITNESSES:
S. J. Van Stavoren
W. H. Norris

INVENTOR,
Chas. E. Ball
By Connolly Bros.
ATTORNEYS

UNITED STATES PATENT OFFICE.

CHARLES E. BALL, OF PHILADELPHIA, PENNSYLVANIA.

DYNAMO OR MAGNETO ELECTRIC MACHINE.

SPECIFICATION forming part of Letters Patent No. 238,631, dated March 8, 1881.

Application filed November 18, 1880. (Model.)

*To all whom it may concern:*

Be it known that I, CHARLES E. BALL, a citizen of the United States, residing at the city of Philadelphia, in the county of Philadelphia and State of Pennsylvania, have invented new and useful Improvements in Dynamo or Magneto Electric Machines, of which the following is a specification, reference being had to the accompanying drawings, wherein—

Figure 1:
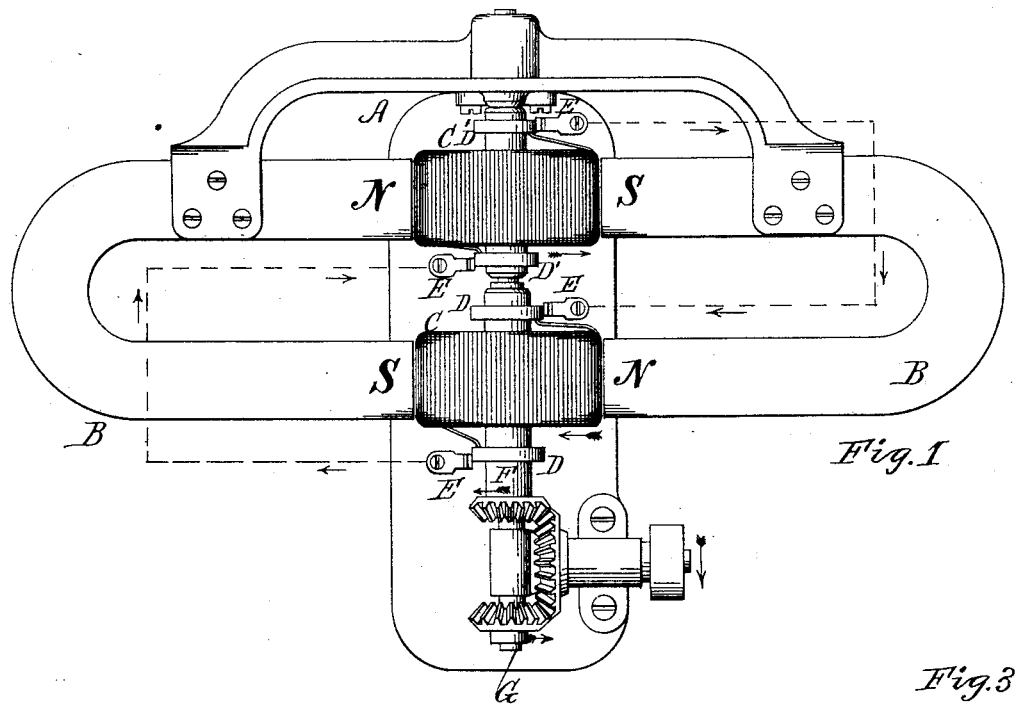
Figures 2, 3:
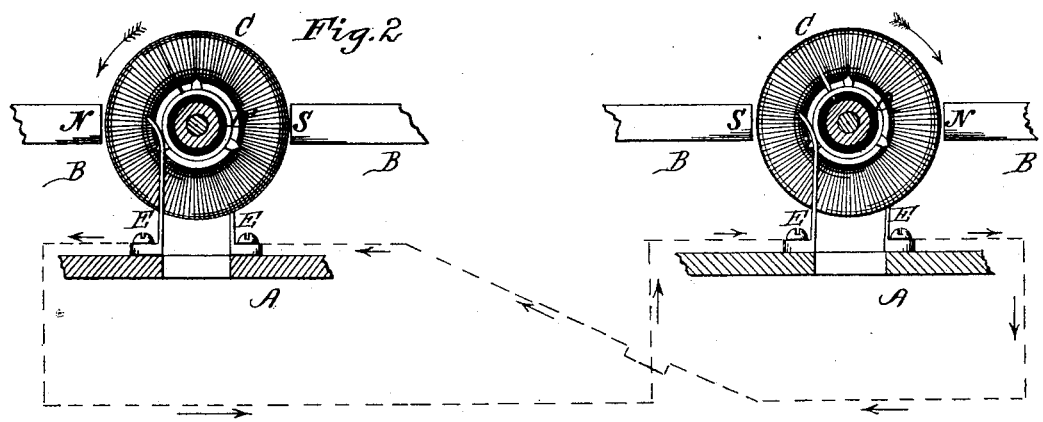
Figure 4:
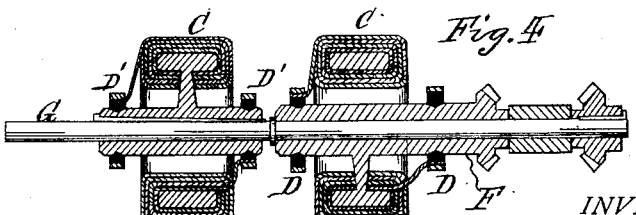
Figure 5:
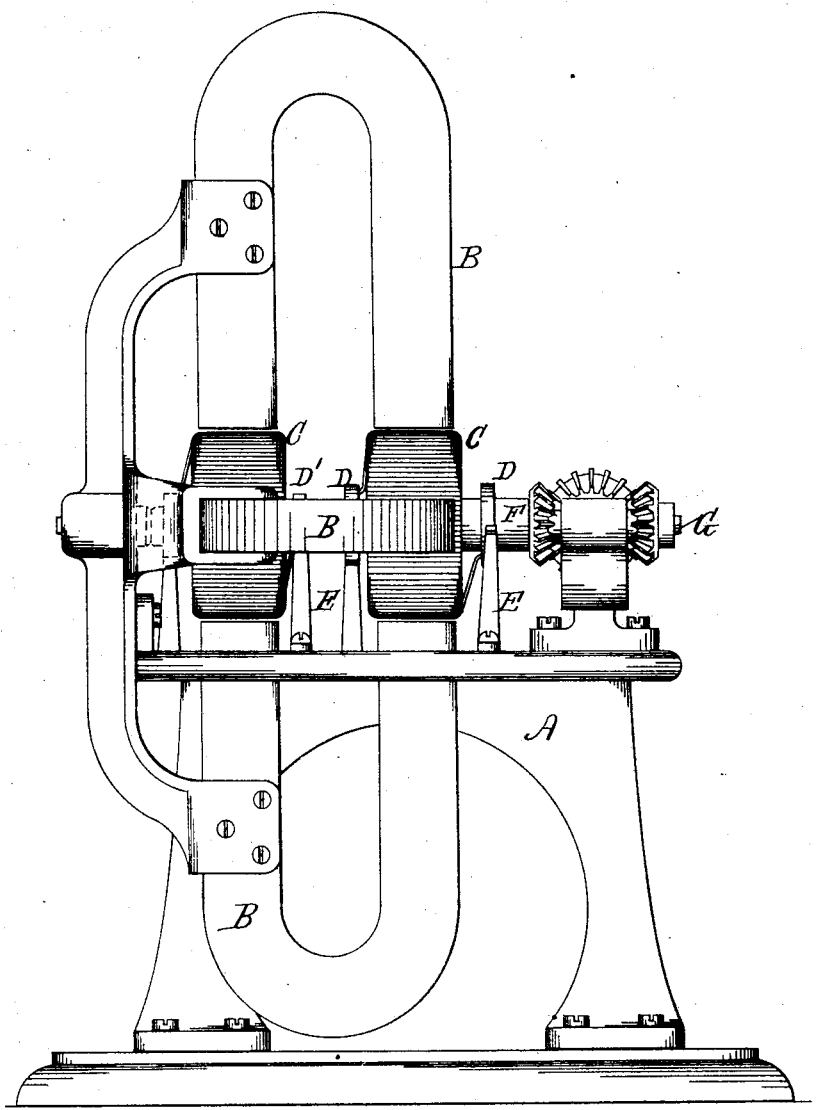

Figure 1 is a plan of a dynamo or magneto electric machine, composed of two field-magnets and armatures, constructed and arranged to operate according to my invention. Figs. 2 and 3 are detail transverse vertical sections. Fig. 4 is a detail longitudinal vertical section of the revolving armatures; and Fig. 5 is an elevation of a dynamo or magneto electric machine of four or more field-magnets with my improvements applied thereto.

My invention has relation to dynamo-electric or magneto-electric machines for generating electrical currents to be used for lighting and other purposes, and has for its object the provision of an apparatus in which the relative arrangement and operation of the parts shall be such that the maximum inducing capacity of the field-magnets will be utilized and the resulting currents obtained of corresponding intensity and quantity.

Another object of my invention is to provide a dynamo-electric battery composed of two or more field-magnets and revolving armatures, wherein the currents induced in the armature-coils may be resolved into a constant current of either polarity or direction without loss of electric energy.

Furthermore, the object of my invention is to produce a dynamo-electric or magneto-electric machine or battery which may be constructed at a comparatively low cost and economically operated, while being productive of the same or equally useful effects as higher-priced or more expensively operated machines.

The machine embodying my invention involves a coiled annular armature rotating between opposite magnetic poles and generating a constant current in direction or of polarity corresponding to the direction in which the armature is rotated.

Instead of a single armature, as heretofore, I use two or more; and instead of arranging the armatures between the opposite poles of the same magnet, as is usual, I arrange them to rotate between unlike poles of two or more field-magnets, and preferably in opposite directions. Each of the field-magnets has its poles opposed to two armatures, while, conversely, each armature rotates within the influence of the opposing poles, respectively, of two field-magnets, and hence I obtain two separate and distinct constant currents from as many armatures. By means of suitable devices for commutating I combine these currents, and hence obtain double the quantity of current or twice the energy heretofore produced.

In the accompanying drawings, A designates the frame-work of my improved dynamo-electric machine, and B B the field-magnets, which latter may be permanent magnets or electro-magnets, according to the conditions that the apparatus is to subserve. The magnets are of the usual horseshoe form, and are arranged, respectively, on opposite sides of an axial line upon which the armatures rotate, the unlike poles opposing or facing each other.

C C are the armatures, consisting of soft-iron rings, upon which are wound many convolutions of insulated wire, having their ends leading to the insulated collars D D D' D', from which the currents are collected by brushes E E, and thence conducted to wherever required. The wire may either entirely cover the rings or it may be wound in radial grooves, so as to leave portions of the iron exposed, in order that the metal may be brought as close, in revolving, to the poles of the magnets as possible. One of the armatures is designed to revolve from right to left and the other from left to right, so that their motion, in relation to the like poles of the magnets, respectively, will be the same. The result will be the production from each armature of the same currents, the two currents being, therefore, either positive or negative.

To effect the proper revolution of the armatures I arrange them on the same axial line; but one of them I secure to a hollow shaft or arbor, F, encircling and embracing the solid shaft G of the other, and then gear the two shafts so that the one main or power shaft will rotate the two shafts in opposite directions.

By this arrangement the relative rotation of the armatures with reference to the respective magnetic poles will be the same, and they will produce identical currents. In order to collect the two currents I so adjust the circuits, as shown in Figs. 1, 2, and 3, that each armature-coil shall complete its circuit through the other and follow the path of its current. There will be, therefore, a complete circuit through the machine when the connecting-lines are closed, and the energy of the current will be equal to the coupled energies of two currents of like energy.

When it is not required to use the full electric power of the apparatus the current may be taken from one only of the armatures, the circuit being completed through the two brushes on opposite sides, respectively, of said armature.

Instead of coupling the two armatures as shown, they may be so coupled as to give alternating currents in opposite directions. So, too, by means of suitable arrangements of gearing, the armatures may be both rotated in the same direction, in which case the currents will be in opposite directions. Commutators will be so arranged that the currents of maximum intensity or quantity, but of opposite polarities, will circulate alternately. Such currents may be used for electric-lighting purpose where it is of advantage to alternate the polarities of the electrodes.

Should it be desired to rectify or convert the currents generated by revolving the armatures in the same direction, commutators will be necessary, so as to direct the opposing or unlike currents in the same path.

The field-magnets may, if electro-magnets are used, be charged by the current induced in the armatures.

What I claim as my invention is as follows:

1. In a dynamo or magneto electric machine or battery, the combination, with two or more horseshoe field-magnets, on opposite sides, respectively, of an axial line, and with the opposing poles facing each other respectively, of two or more coiled armatures, arranged to revolve on said axial line, each between the unlike and opposing poles of two separate magnets, substantially as shown and described.

2. The combination, in a dynamo or magneto electric machine, of two or more revolving coiled armatures, and two or more field-magnets of horseshoe form or character, on opposite sides of and parallel with the axis of the armature, each of said armatures being within the inductive field or influence of the unlike poles of two or more magnets, so that when the armatures are revolved they will operate in identical magnetic spheres and generate identical currents, substantially as described.

3. In a dynamo or magneto electric machine, the combination, with two or more field-magnets arranged, respectively, on opposite sides of an axial line, so that the north pole of one shall oppose or face the south pole of the other, and vice versa, of two or more armatures arranged between the opposing poles of the two magnets, respectively, and provided with suitable means for rotating in opposite directions simultaneously, so as to generate currents of like polarity and energy.

4. In a dynamo or magneto electric machine in which two or more armatures rotate within the inductive influence of two or more horseshoe-magnets whose unlike poles oppose each other, respectively, as set forth, the combination and arrangement of circuits and commutators, substantially as shown and described, whereby the currents generated in the two armatures will both follow the same path, substantially as shown and described.

In testimony that I claim the foregoing I have hereunto set my hand this 16th day of November, 1880.

CHAS. E. BALL.

Witnesses:
SAML. J. VAN STAVOREN,
CHAS. F. VAN HORN.